(12) United States Patent
Kennedy

(10) Patent No.: US 10,890,207 B2
(45) Date of Patent: Jan. 12, 2021

(54) CONNECTION TO A SUCTION DISC

(71) Applicant: Curtis Kennedy, Fredericton (CA)

(72) Inventor: Curtis Kennedy, Fredericton (CA)

(73) Assignee: Vertiball Solutions Ltd., Saint-John (CA)

( * ) Notice: Subject to any disclaimer, the term of this patent is extended or adjusted under 35 U.S.C. 154(b) by 350 days.

(21) Appl. No.: 15/998,115

(22) Filed: Jul. 5, 2018

(65) Prior Publication Data
US 2020/0011369 A1    Jan. 9, 2020

Related U.S. Application Data

(60) Provisional application No. 62/604,409, filed on Jul. 6, 2017.

(51) Int. Cl.
| | |
|---|---|
| *F16B 47/00* | (2006.01) |
| *F16B 2/18* | (2006.01) |
| *B25J 15/06* | (2006.01) |

(52) U.S. Cl.
CPC ............ *F16B 47/006* (2013.01); *F16B 2/185* (2013.01); *Y10T 403/595* (2015.01); *Y10T 403/599* (2015.01)

(58) Field of Classification Search
CPC . F16B 47/006; F16B 2/18; F16B 2/185; B25J 15/065; B25J 12/0666; Y10S 160/13; Y10S 116/24; Y10T 403/595; Y10T 403/599
USPC .............................. 403/322.4, 325
See application file for complete search history.

(56) References Cited

U.S. PATENT DOCUMENTS

| | | | |
|---|---|---|---|
| 3,020,017 A | | 12/1958 | Watson |
| 3,612,044 A | | 10/1971 | Gurrola |
| 3,750,991 A | * | 8/1973 | Ragir ...................... F16B 47/00 |
| | | | 248/205.8 |
| 4,014,051 A | | 3/1977 | Pettit |
| 4,324,514 A | | 4/1982 | Craven |
| 4,696,068 A | | 9/1987 | Kenner |
| 5,047,102 A | | 9/1991 | Emery |
| 5,345,640 A | | 9/1994 | Goss |
| 5,356,038 A | * | 10/1994 | Banks .................. A47K 5/1204 |
| | | | 222/105 |

(Continued)

FOREIGN PATENT DOCUMENTS

| | | |
|---|---|---|
| CA | 1037783 | 9/1978 |
| DE | 197 55 063 A1 | 6/1999 |

*Primary Examiner* — Amber R Anderson
*Assistant Examiner* — Aubrey Fallon Martin
(74) *Attorney, Agent, or Firm* — Mario Theriault

(57) ABSTRACT

The connection of an accessory to a suction disc module comprises a lever mounted to the suction disc module; a latch bar on each side of that lever, and a raised shoulder on a top surface of the lever. The accessory has a pair of inclined latch blocks for engagement with the latch bars and a square-edge boss for engagement with the raised shoulder. The lever is urged away from the suction disc module by a spring. The lever has an overrun in a displacement thereof while a displacement of the spring remains constant. The lever is selectively movable along this overrun for engaging the latch bars with the inclined latch blocks and for engaging the raised shoulder with the square-edge boss. This latter engagement of the raised shoulder with the square-edge boss prevents an excess movement of the connecting direction, and urges the accessory in the release direction.

19 Claims, 8 Drawing Sheets

(56) References Cited

U.S. PATENT DOCUMENTS

| | | | |
|---|---|---|---|
| 5,452,874 | A | 9/1995 | Kozloff et al. |
| 5,774,907 | A | 7/1998 | Doggwiler |
| 5,785,304 | A | 7/1998 | Little |
| 6,053,464 | A | 4/2000 | Cardarelli |
| 6,058,545 | A | 5/2000 | Roach |
| 6,308,923 | B1 | 10/2001 | Howard |
| 6,370,722 | B1 | 4/2002 | Duckworth |
| 6,386,494 | B1 | 5/2002 | Huang |
| 6,464,185 | B1 | 10/2002 | Minelli et al. |
| 6,609,689 | B1 * | 8/2003 | Knapp ............... A47K 5/04 248/205.5 |
| 6,637,707 | B1 | 10/2003 | Gates et al. |
| 6,732,394 | B1 | 5/2004 | Waterman |
| 6,808,090 | B2 | 10/2004 | Pedersen |
| 6,913,232 | B2 | 7/2005 | Richter |
| 7,066,434 | B2 | 6/2006 | Kwok |
| 7,090,085 | B1 * | 8/2006 | Vicendese ........... A47F 5/08 211/106.01 |
| D589,332 | S | 3/2009 | Bevirt |
| 7,661,638 | B2 | 2/2010 | Yu |
| 7,975,972 | B1 | 7/2011 | Hajianpour |
| 8,104,809 | B1 | 1/2012 | Mayhugh |
| 8,191,839 | B2 | 6/2012 | Fan |
| 8,348,216 | B2 | 1/2013 | Hajianpour |
| 8,366,341 | B2 * | 2/2013 | Bevirt ............... F16M 13/022 403/381 |
| 8,584,997 | B2 | 11/2013 | Hajianpour |
| 9,022,310 | B2 | 5/2015 | Huang |
| 9,200,667 | B1 | 12/2015 | Hsu |
| 9,732,785 | B2 | 8/2017 | Kobayashi |
| 2005/0236538 | A1 * | 10/2005 | Schmidt ............. A47K 5/02 248/205.5 |
| 2007/0246622 | A1 | 10/2007 | Fistor |
| 2008/0217493 | A1 | 9/2008 | Bevirt |
| 2015/0230638 | A1 * | 8/2015 | Jagger ............... A01K 7/005 220/574 |
| 2017/0067275 | A1 * | 3/2017 | Tomassi ............ E05B 65/0894 |

* cited by examiner

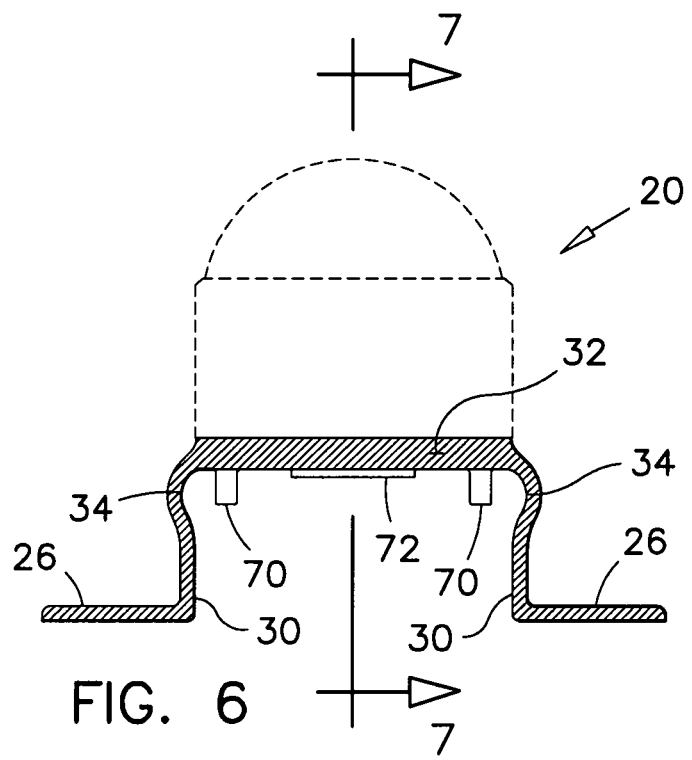
FIG. 6
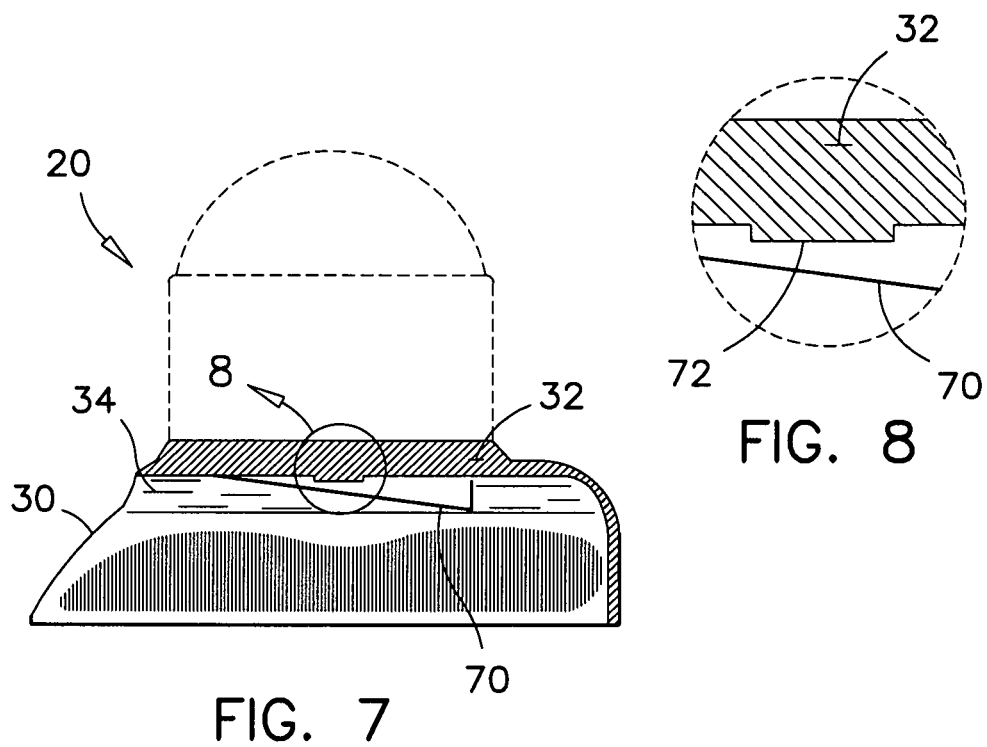
FIG. 7
FIG. 8

CONNECTION TO A SUCTION DISC

This patent application claims the benefit of U.S. Provisional Application No. 62/604,409, filed Jul. 6, 2017.

FIELD OF THE INVENTION

This invention pertains to connections of various accessories to a suction disc, and more particularly it pertains to a removable connection of an accessory to a suction disc module.

BACKGROUND OF THE INVENTION

Great improvements have been made in the recent past in the field of suction discs. These discs are now made with different materials and different configurations, and are no longer limited to impervious and flat surfaces. The newer discs can retain their hold for extended periods of time to painted surfaces, synthetic fabrics and surfaces that are not perfectly planar. Accordingly, a number of different personal care items, household articles and dashboard instrument holders have been developed for attachment to a suction disc.

The following documents represent a good inventory of various accessories mounted to suction discs that can be found in the prior art. The following documents disclose one or more suction discs supporting various devices, including medical panels of different sorts; back massage and scrubbing fixtures, towel bars; a shampoo bottle; various hooks, dashboard article holders; cup holders; a telescope; an adhesive tape dispenser; a wood router guide; a computer screen, a beeper, and a fishing fly making tool kit including a vise, and even a portable safe:

U.S. Pat. No. 3,020,017 issued to W. S. Watson on Feb. 6, 1962;
U.S. Pat. No. 3,612,044 issued to H. R. Gurrola on Oct. 12, 1971;
U.S. Pat. No. 3,750,991 issued to M. J. Ragir on Aug. 7, 1963;
U.S. Pat. No. 4,014,051 issued to L. A. Pettit on Mar. 29, 1977;
U.S. Pat. No. 4,324,514 issued to M. Craven on Apr. 13, 1982;
U.S. Pat. No. 4,696,068 issued to M. B. Kenner on Sep. 29, 1987;
U.S. Pat. No. 5,345,640 issued to M. A. Goss on Sep. 13, 1994;
U.S. Pat. No. 5,452,874 issued to M. S. Kozloff et al., on Sep. 26, 1995;
U.S. Pat. No. 5,774,907 issued to M. Doggwiler on Jul. 7, 1998;
U.S. Pat. No. 5,785,304 issued to F. Little on Jul. 28, 1998;
U.S. Pat. No. 6,053,464 issued to V. Cardarelli on Apr. 25, 2000;
U.S. Pat. No. 6,058,545 issued to F. Z. Roach on May 9, 2000;
U.S. Pat. No. 6,308,923 issued to H. S. Howard on Oct. 30, 2001;
U.S. Pat. No. 6,370,722 issued to D. Duckworth on Apr. 6, 2002;
U.S. Pat. No. 6,386,494 issued to P. C. Huang on May 14, 2002;
U.S. Pat. No. 6,464,185 issued to J. D. Minelli et al. On Oct. 15, 2002;
U.S. Pat. No. 6,637,707 issued to G. D. Gates et al., on Oct. 28, 2003;
U.S. Pat. No. 6,732,394 issued to C. W. Waterman on May 11, 2004;
U.S. Pat. No. 6,808,090 issued to P. Pedersen on Oct. 26, 2004;
U.S. Pat. No. 6,913,232 issued to H. Richter on Jul. 5, 2005;
U.S. Pat. No. 7,066,434 issued to C. P. Kwok on Jun. 27, 2006;
U.S. Design 589,332 issued to J. Bevirt on Mar. 31, 2009;
U.S. Pat. No. 7,661,638 issued to L. C. Yu on Feb. 16, 2010;
U.S. Pat. No. 7,975,972 issued to Z. Hajianpour on Jul. 12, 2011;
U.S. Pat. No. 8,104,809 issued to K. R. Mayhugh on Jan. 31, 2012;
U.S. Pat. No. 8,191,839 issued to E. Fan on Jun. 5, 2012;
U.S. Pat. No. 8,348,216 issued to Z. Hajianpour on Jan. 8, 2013;
U.S. Pat. No. 8,366,341 issued to J. Bevirt on Feb. 5, 2013;
U.S. Pat. No. 8,584,997 issued to Z. Hajianpour on Nov. 19, 2013;
U.S. Pat. No. 9,022,310 issued to H. Huang on May 5, 2015;
U.S. Pat. No. 9,200,667 issued to C. C. Hsu on Dec. 1, 2015;
U.S. Pat. No. 9,732,785 issued to F. Kobayashi on Apr. 15, 2017;
US 2005/0,236,538 published by G. Schmidt et al., on Oct. 27, 2005;
US 2007/0,246,622 published by L. A. Fistor on Oct. 25, 2007;
US 2008/0,217,493 published by J Bevirt on Sep. 11, 2008;
DE Patent 197 55 063 issued to S. Heidrun on Jun. 17, 1999;
CA Patent 1,037,783 issued to O. Ziegel on Sep. 5, 1978.

Although all the suction disc connections found in the prior art deserve undeniable merits, there remains a difficulty in undoing the connection of an accessory from a suction disc without releasing the vacuum inside the suction disc. Sometimes, it is desirable to take off one accessory from a suction disc and replaced it by another accessory without changing the location of the suction disc. When this accessory is mounted to the suction disc in a slide-like or wedge-like mounting, the accessory often get stuck in its mounting. Twisting and pulling must be applied to the accessory to release it from its mounting. This twisting and pulling on an accessory often cause the suction disc to lose its vacuum, and to be released from its mounting surface.

Therefore it is believed that there is a market need for a connection of an accessory to a suction disc that can be undone without causing any stress on the suction disc itself.

SUMMARY OF THE PRESENT INVENTION

In the present invention, there is provided a connection of an accessory to a lever-actuated suction disc module wherein the lever is moved into an overrun displacement of its travel to connect or to unlatch an accessory from the suction disc module.

In a first aspect of the present invention, there is provided a connection of an accessory to a suction disc module. This connection comprises a lever mounted to the suction disc module; a latch bar on each side of that lever; a raised shoulder on a top surface of the lever; and an embossment bordering each side of the lever. The accessory has a pair of grooves therein for engagement with the embossments; a pair of inclined latch blocks for engagement with the latch bars and a square-edge boss for engagement with the raised shoulder. The lever is urged away from the suction disc module by a spring. The lever has an overrun in its displacement, while a compression of the spring remains constant. The lever is selectively movable along this overrun displacement for engaging the latch bars with the inclined latch blocks and for engaging the raised shoulder with the square-edge boss. This latter engagement of the raised shoulder with the square-edge boss prevents an excess movement of the grooves along the embossments, and prevents a wedging of the accessory to the suction disc module. This latter engagement also urges the lever to return to a latching position.

In another aspect of the present invention, the lever is selectively movable along the overrun displacement for disengaging the latch bars from the inclined latch blocks and for urging the raised shoulder against the square-edge boss, for forcefully moving the accessory out of its engagement from the suction disc module.

In yet another aspect of the present invention, the lever is connected to a pin mounted to the diaphragm of the suction disc module. The lever has a cam mounted thereto acting on a spring, and the cam has a region of constant radius thereon corresponding to the overrun displacement of the lever.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

Two preferred embodiments of a connection of an accessory to a suction disc according to the present invention is described herein with the aid of the accompanying drawings, in which like numerals denote like parts throughout the several views:

FIG. 6 is a partial cross-section view of the massage ball accessory, as seen along line 6-6 in FIG. 2;

FIG. 7 is a partial cross-section view of the massage ball accessory, as seen along line 7-7 in FIG. 6;

FIG. 8 is an enlarged view at the square-edge boss under the base of the massage ball accessory, as seen in detail circle 8 in FIG. 7;

FIG. 9 is a partial cross-section view of the massage ball accessory mounted to the suction disc module, as seen along line 9-9 in

FIG. 1;

Figure 1:
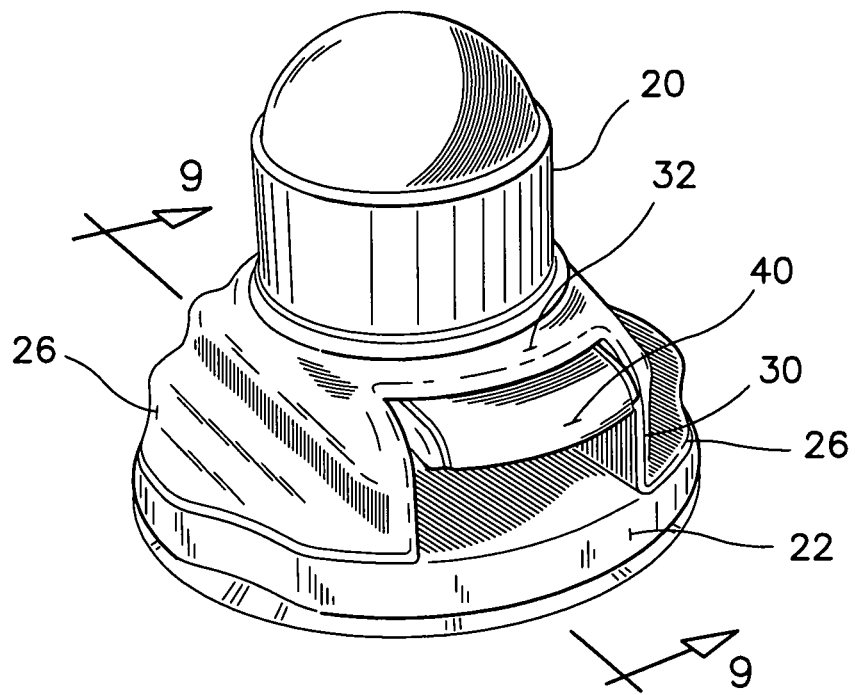
FIGS. 1 and 2 are perspective representation of a massaging ball accessory mountable to suction disc module, using a connection according to the first preferred embodiment of the present invention.

The drawings presented herein are presented for convenience to explain the functions of all the elements included in the preferred embodiments of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

Also, the massaging ball accessory illustrated in the drawings has been drawn for convenience only and does not constitute a limitation of the present invention. It is believed that any useful element mountable to a lever-actuated suction disc can benefit from the connections disclosed herein, and therefore it should be appreciated that the massaging ball accessory is a substitute for any of these useful elements.

DESCRIPTION OF THE PREFERRED EMBODIMENTS

Figure 2:
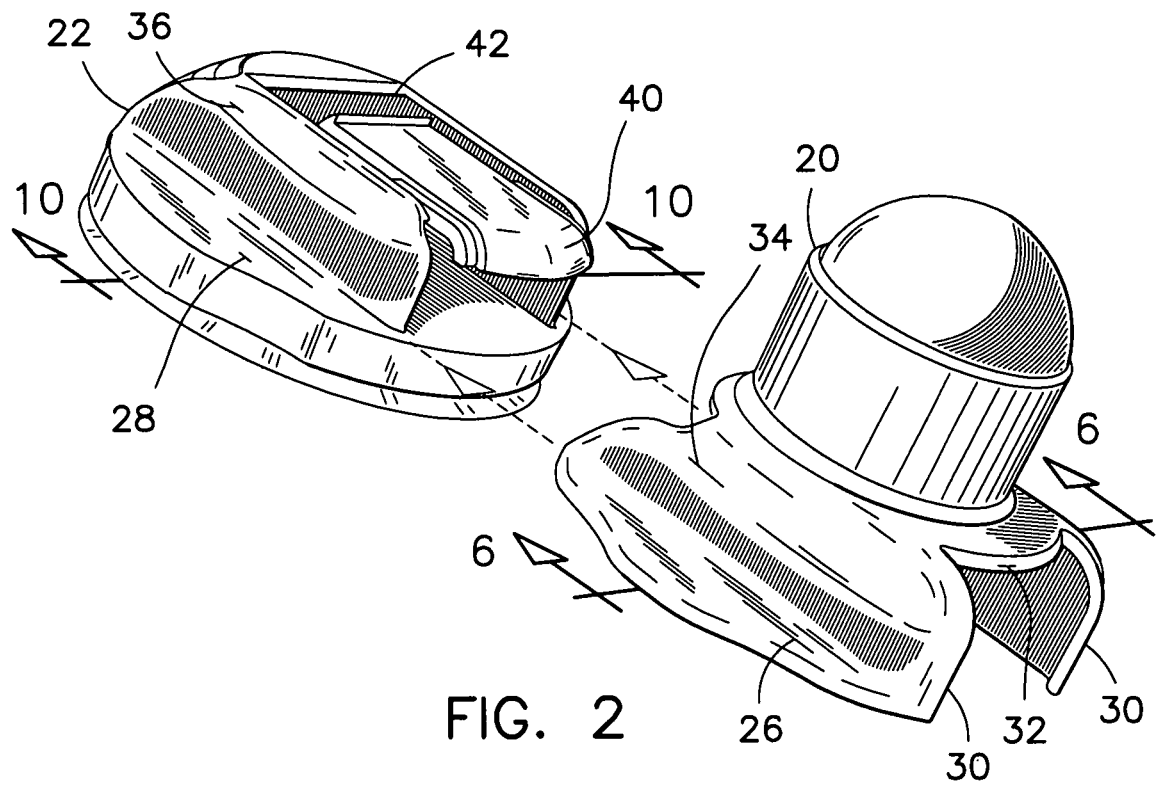

Referring firstly to FIGS. 1 and 2 the massaging ball accessory is labeled as 20 and a suction disc module is labeled as 22. The massaging ball accessory 20 has a pair of oppositely and horizontally extending wings 26. These wings 26 slide over flat surfaces 28 on the base of the suction disc module 22. The massaging ball accessory 20 has two vertical walls 30 connecting the wings 26 to the main body 32 of the accessory. Each of these vertical walls 30 has a groove 34 there along registering with a similarly-shaped embossment 36 on each side the suction disc module 22.

Both walls 30 define with the main body 32 of the accessory 20 an inverted U shape member 30,32 connecting the wings 26 to the main body 32 of the accessory 20. The wings 26 provide vertical alignment in the connection while the grooves 34 and embossments 36 provide horizontal alignment and a retention attribute to the connection. The U-shaped member 30,32 slides over a lever 40 mounted to the suction disc module 22 without applying any pressure to the lever 40.

Referring particularly to the suction disc module 22 as illustrated in FIG. 2, the lever 40 has a raised shoulder 42 on its far end. A first purpose of this shoulder 42 is to limit the travel of the U-shaped member 30,32 along the engagement of the U-shaped member onto the embossments 36, to prevent a wedging action and a difficult release between the grooves 34 of the accessory 20 over the embossments 36.

A second purpose of the raised shoulder 42 is to urge the lever 40 upward in a rest or latching position as soon as the accessory 20 reaches a full engagement with the suction disc module 22. The moment applied to the raised shoulder 42 about the mounting pin of the lever by the movement of the accessory 20 against the raised shoulder 42 causes this action.

The third purpose of the raised shoulder 42 is to forcefully urge the U-shaped member 30, 32 out of its engagement when the lever 40 is depressed. This latter action is better explained while referring to FIGS. 3-9.

Figure 3:
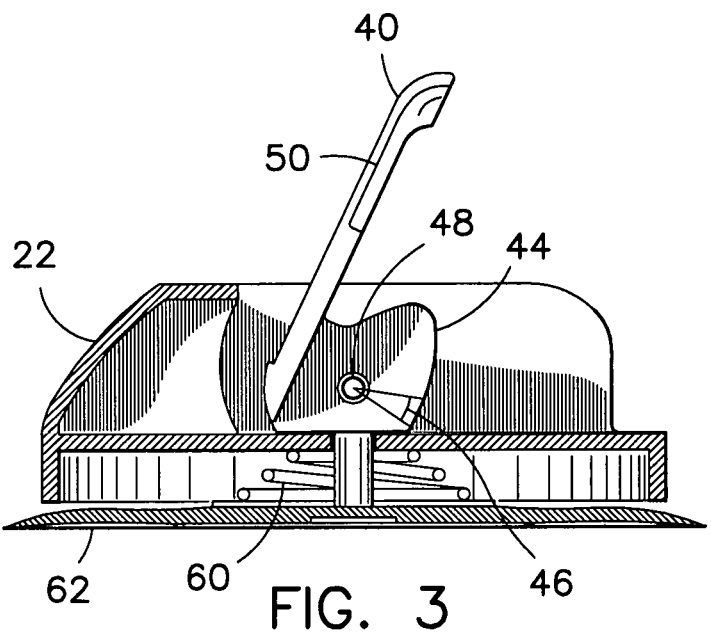
FIG. 3 is a cross-section view of the suction disc module with the lever in a first position.

In FIG. 3, the lever 40 of the suction disc module 22 has a cam 44 thereunder. When this cam 44 is in a raised position, the spring 60 of the module 22 pushes the diaphragm 62 of the suction disc module 22 to a flat and releasing mode.

Figure 4:
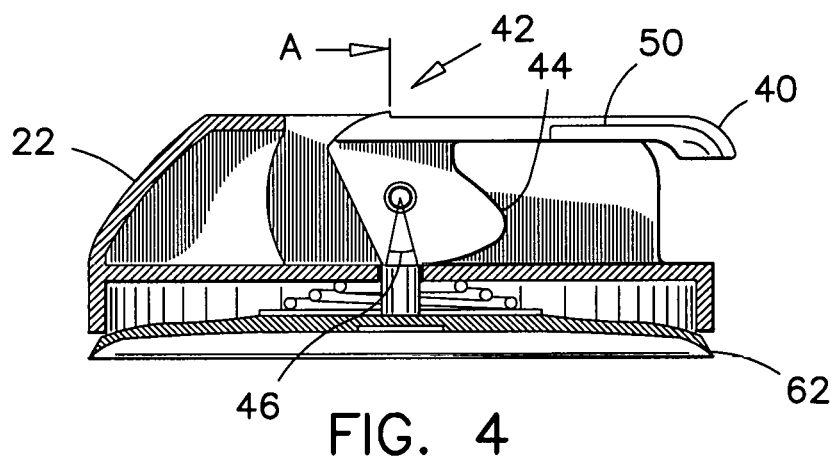
FIG. 4 is a same cross-section view as in FIG. 3 but with the lever in a second, at rest or latched position.

When the lever is positioned parallel with the diaphragm 62 of the suction disc module 22, the cam 44 is positioned to pull the spring 60 and the diaphragm 62 upward, as illustrated in FIG. 4, the cam 44 pulls the diaphragm 62 into a concave mode and creates a vacuum under the diaphragm 62. This establishes a first position A of the raised shoulder 42.

Figure 5:
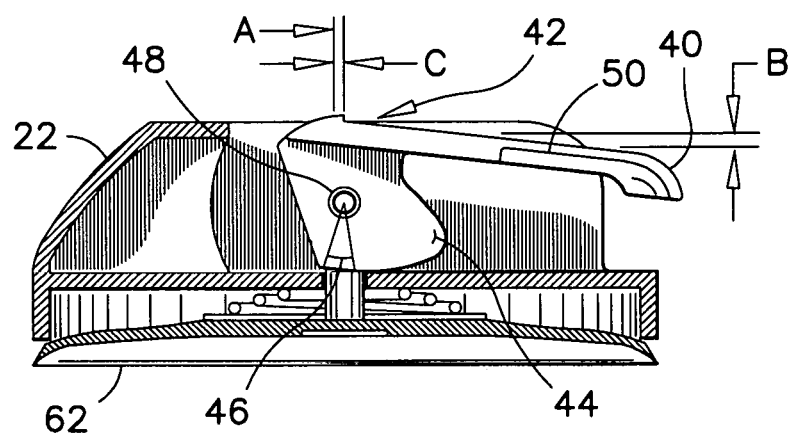
FIG. 5 is a same cross-section view as in FIG. 3, with the lever in an overrun, or latching or unlatching position.

Referring to FIG. 5, the cam 44 has a region 46 of circular shape having a constant radius about its mounting pin 48. Because of this constant radius curvature 46 of the cam 44, the lever 40 has an overrun distance B which is equivalent to at least the thickness of the latch bars 50 alongside the lever 40. The movement of the lever in this overrun displacement B is effected without pulling or pushing on the diaphragm 62.

The displacement of the lever 40 in its overrun displacement B causes the raised edge 42 to move backward from position A over a distance C.

The massaging ball accessory 20 has two spaced-apart inclined latch blocks 70 mounted under the base 32 thereof, and a square-edge boss 72 positioned between the inclined latch blocks 70. The latch blocks 70 and the square-edge boss 72 are illustrated in FIGS. 6-8.

Figure 9:
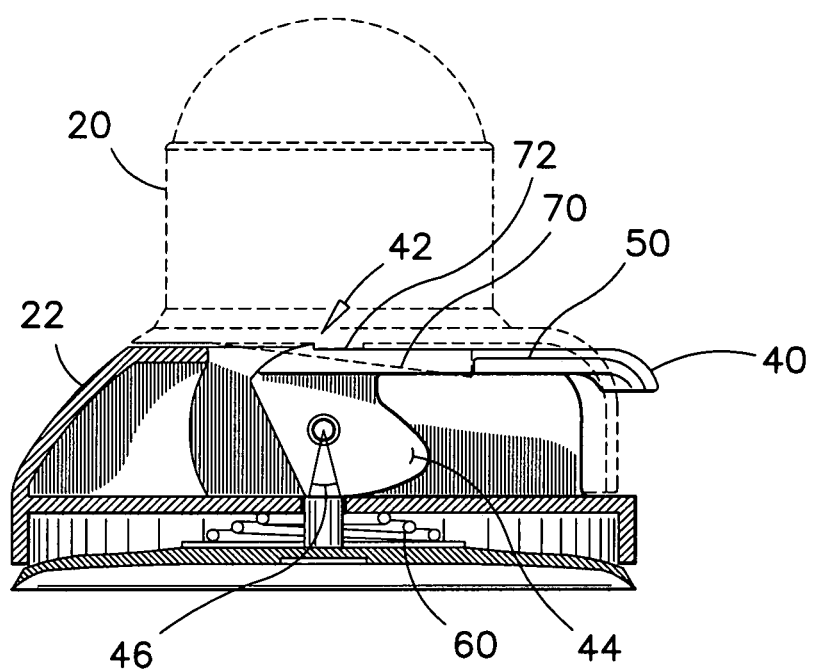

Referring now to FIG. 9, when the massaging ball accessory 20 slides over the suction disc module 22, the inclined blocks 70 engage with the latch bars 50 on the lever and cause the lever 40 to tilt down along an overrun displacement B until the square-edge boss 72 engages against the raised shoulder 42. Then the pressure of the spring 60 and the pressure of the accessory 20 against the raised edge 42 cause the lever 40 to return to its parallel position wherein the latch bars 50 engage with the ends of the inclines blocks 70 to retain the accessory to the suction disc module 22.

Referring again to FIG. 5 and FIG. 9, it will be appreciated that a pressing down on the lever 40 causes the latch bars 50 to disengage from the latch blocks 70, while the raised edge 42 pushes on the square-edge boss 72 over a distance C. Because the lever 40 is made of a plastic material and have a certain flexibility, the lever 40 flexes slightly to disengage the latch bars 50 from the inclined blocks 70 while increasing a pressure between the raised edge 42 and the square-edge boss 72. As soon as the inclined blocks 70 are released, the entire accessory 20 is forcefully urged backward to partly disengage from the suction disc module 22. This release of the inclined latch blocks 70 and the release of the accessory using the pressure of the raised shoulder 42 is done while tilting the lever along its overrun distance, without applying any adverse pressure or twisting on the suction disc module 22.

Figure 10:
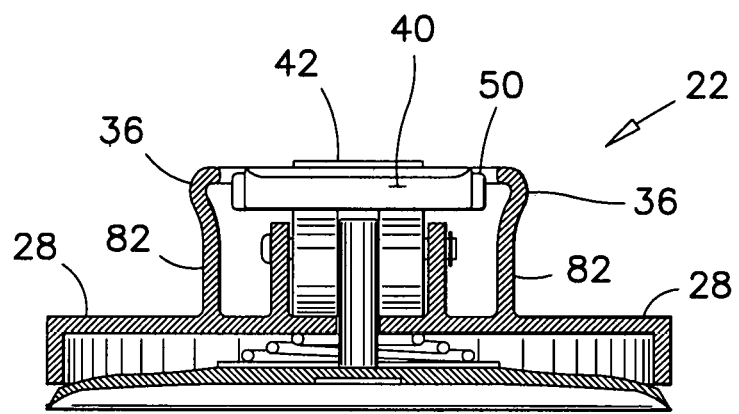
FIG. 10 is partial cross-section view of the suction disc module, as seen along line 10-10 in FIG. 2.
Figure 11:
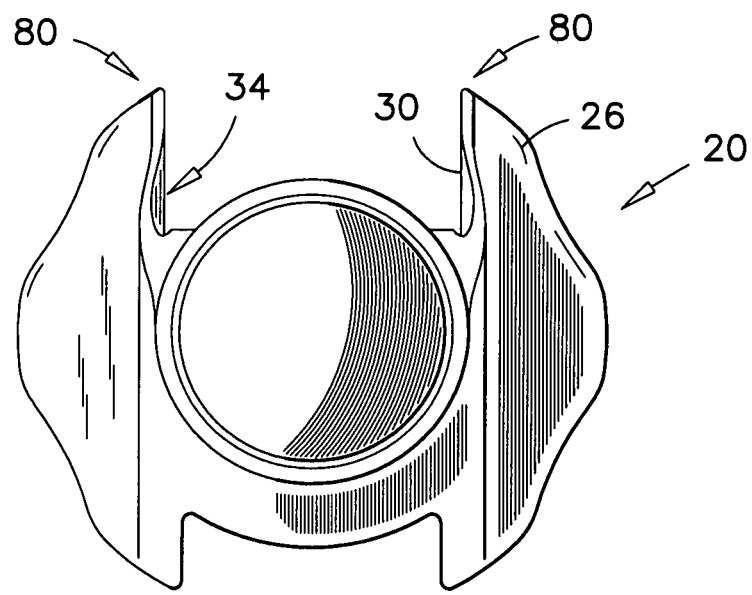
FIG. 11 is a top view of the massaging ball accessory.
Figure 12:
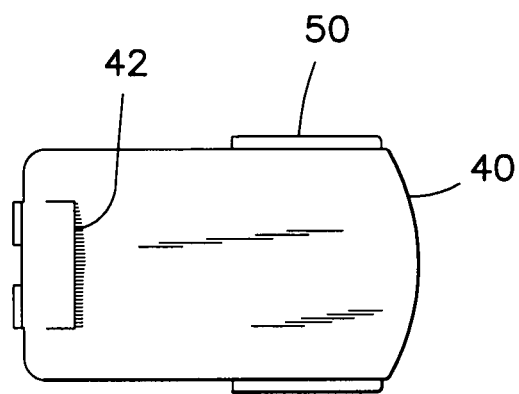
FIGS. 12, 13 and 14 are a top view, a side view and end view respectively, of the lever mounted to the suction disc module.
Figures 13, 14:
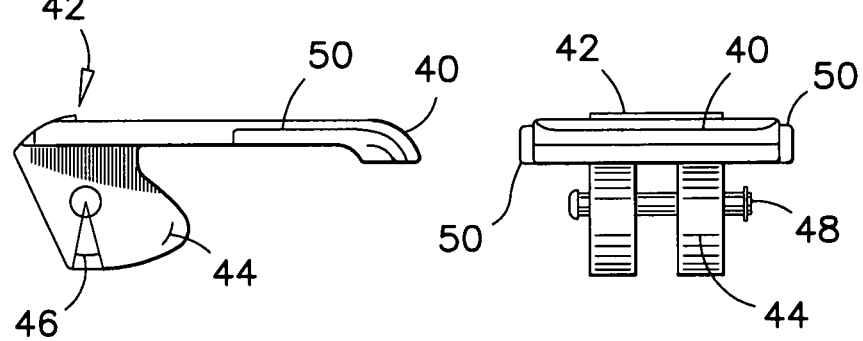
Figure 15:
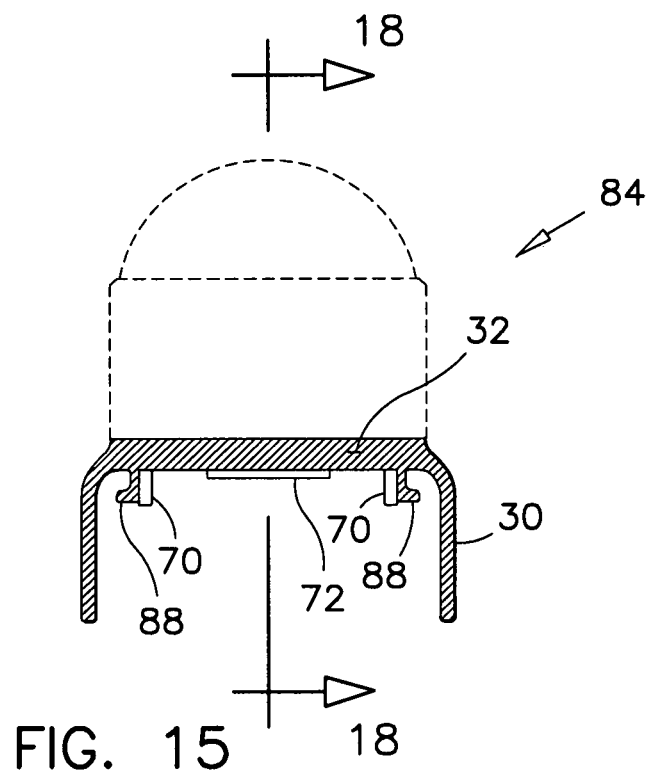
FIG. 15 is a partial cross-section view of the massaging ball accessory showing a portion of the connection according to the second preferred embodiment of the present invention.
Figure 16:
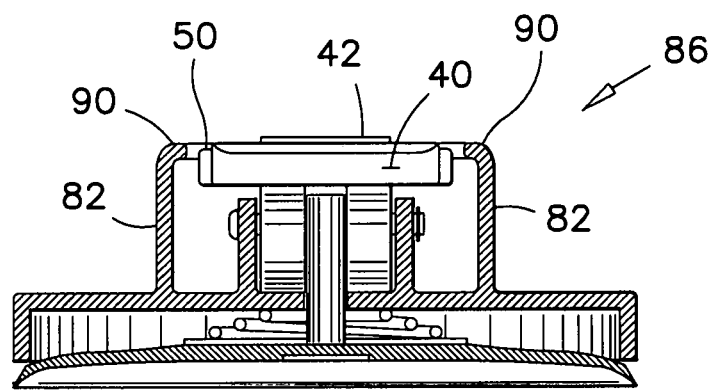
FIG. 16 is a partial cross-section view of the suction disc module showing a portion of the connection according to the second embodiment of the present invention.

Referring now to FIGS. 10 and 11, it will be appreciated that the walls 30 and the wings 26 of the massaging ball accessory 20 extend a substantial distance forward toward an engagement direction. The two wing tips 80 constitute guides for guiding the grooves 34 along the sides 82 of the suction disc module 22 and over the embossments 36 of the suction disc module 22.

In a second preferred embodiment, as illustrated in FIGS. 15-18, the massaging ball accessory 84 has vertical walls 30; inclined latch blocks 70 and square-edge boss 72, but does not have wings. The accessory 84 has two curved lips 88 extending along and outside the inclined latch blocks 70 thereof. In this second preferred embodiment, the suction disc module 86 has a lever 40, with latch bars 50 and raised shoulder 42. The suction disc module 86 further has two curved shoulders 90 extending along the sides 82 thereof. The precise engagement of the accessory 84 over the suction disc module 86 is guided by the engagement of the curved lips 88 of the accessory 84 over the curved shoulders 90 of the suction disc module 86.

Figure 17:
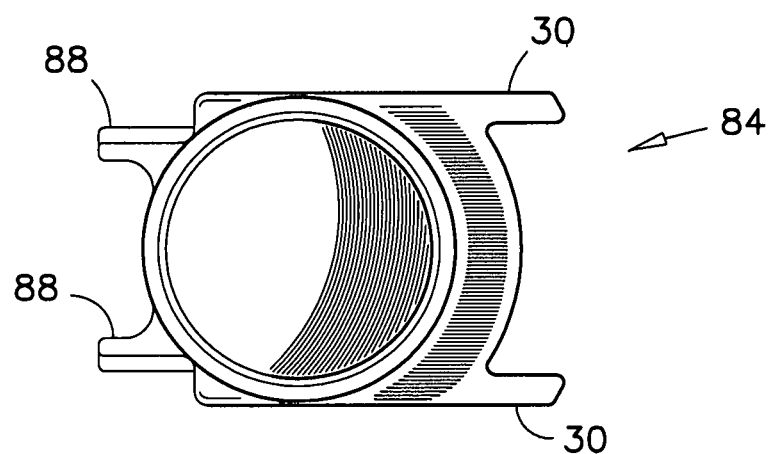
FIG. 17 is a top view of the massaging ball accessory showing a portion of the connection according to the second preferred embodiment of the present invention.
Figure 18:
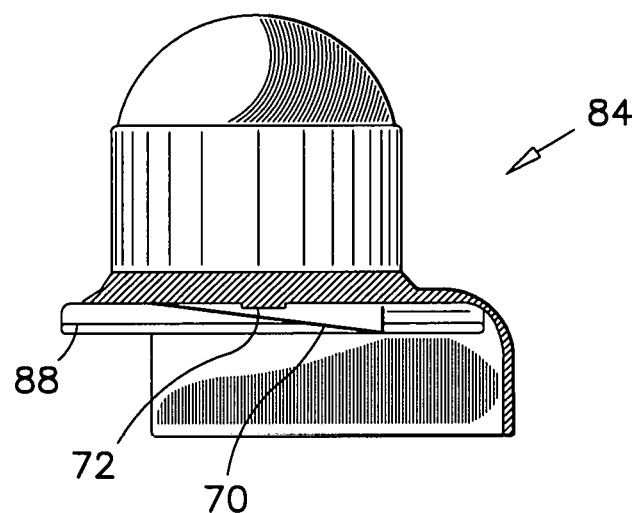
FIG. 18 is a cross-section of the massaging ball accessory as shown in FIG. 15, as seen along line 18-18 in FIG. 15.

The curved lips 88 preferably extend forward in a direction of engagement of the accessory 84 with the suction disc module 86 as illustrated in FIGS. 17 and 18. The extended lips 88 facilitate the guiding and the engagement of the accessory to the suction disc module 86.

While two embodiments of the present invention has been illustrated in the accompanying drawings and described herein above, it will be appreciated by those skilled in the art that various modifications, alternate constructions and equivalents may be employed. For example, there can be more than two embodiments for aligning and engaging an accessory onto a suction disc module. Similarly, it should be understood that the massaging ball or other device may be removably mounted by any means to a receiving sub-base having the function of the accessory described herein for engaging a suction disc module. Therefore, the above description and illustrations should not be construed as limiting the scope of the invention, which is defined in the appended claims.

What is claimed is:

1. A connection of an accessory to a suction disc module, comprising: a lever mounted to said suction disc module; a latch bar on each side of said lever; a raised shoulder on a top surface of said lever; and an embossment bordering each side of said lever; said accessory having a pair of grooves therein for engagement with said embossments; a pair of inclined latch blocks for engagement with said latch bars and a square-edge boss for engagement with said raised shoulder; said lever being urged away from said suction disc module by a spring; said lever having an overrun in a displacement thereof while a displacement of said spring remains constant;

said lever being selectively movable along said overrun for engaging said latch bars with said inclined latch blocks and for engaging said raised shoulder with said square-edge boss.

2. The connection as claimed in claim 1, wherein said lever being selectively movable along said overrun for disengaging said latch bars from said inclined latch blocks and for urging said raised shoulder against said square-edge boss for forcefully moving said accessory out of engagement from said suction disc module.

3. The connection as claimed in claim 1, wherein said accessory further has wings thereon for guiding a movement of said accessory relative to said suction disc module.

4. The connection as claimed in claim 3, wherein said wings have wing tips and said wing tips being spaced apart a same distance as a width between side walls on said suction disc module.

5. The connection as claimed in claim 4 wherein said wing tips being positioned forward relative to a direction of engagement of said grooves over said embossments.

6. The connection as claimed in claim 1, wherein said lever has a cam mounted thereto acting on said spring, and said cam has a region of constant radius thereon corresponding to a displacement of said lever along said overrun.

7. The connection as claimed in claim 1, wherein said lever is made of a flexible material.

8. The connection as claimed in claim 1, wherein said lever is connected to a pin connected to the diaphragm of said suction disc module.

9. The connection as claimed in claim 1, wherein said engagement of said raised shoulder with said square-edge boss is a abutment engagement, for limiting a relative movement in a forward direction of said accessory relative to said suction disc module.

10. The connection as claimed in claim 9, wherein said engagement of said latch bars on said lever with said inclined latch blocks on said accessory is a latching engagement, for limiting a relative movement of said accessory relative to said suction disc module in a backward direction.

11. A connection of an accessory to a suction disc module, comprising: a lever mounted to said suction disc module; a latch bar on each side of said lever; a raised shoulder on a top surface of said lever; and an embossment bordering each side of said lever; said accessory having a pair of grooves therein for engagement with said embossments; a pair of inclined latch blocks for engagement with said latch bars and a square-edge boss for engagement with said raised shoulder; said lever being urged away from said suction disc module by a spring; said lever having an overrun in a displacement thereof while a displacement of said spring remains constant;

said lever being selectively movable along said overrun for engaging said latch bars with said inclined latch blocks and for engaging said raised shoulder with said square-edge boss for preventing an excess movement of said grooves along said embossments, and said lever being selectively movable along said overrun for disengaging said latch bars from said inclined latch blocks and for urging said raised shoulder against said square-edge boss for moving said accessory out of engagement from said suction disc module.

12. The connection as claimed in claim 11, wherein said lever has a cam mounted thereto acting on said spring, and said cam has a region of constant radius thereon corresponding to a displacement of said lever along said overrun.

13. The connection as claimed in claim 12, wherein said lever is made of a flexible material.

14. The connection as claimed in claim 12, wherein said lever is connected to a pin mounted to the diaphragm of said suction disc module.

15. The connection as claimed in claim 12, wherein said engagement of said raised shoulder with said square-edge boss is a abutment engagement, for limiting a relative movement in a forward direction of said accessory relative to said suction disc module.

16. The connection as claimed in claim 15, wherein said engagement of said latch bars on said lever with said inclined latch blocks on said accessory is a latching engagement, for limiting a relative movement of said accessory relative to said suction disc module in a backward direction.

17. A connection of an accessory to a suction disc module, comprising: a lever mounted to said suction disc module; a latch bar on each side of said lever; a raised shoulder on a top surface of said lever; and a curved shoulder bordering each side of said lever; said accessory having a pair of curved lips therein for engagement with said curved shoulders; a pair of inclined latch blocks for engagement with said latch bars and a square-edge boss for engagement with said raised shoulder; said lever being urged away from said suction disc module by a spring; said lever having an overrun in a displacement thereof while a displacement of said spring remains constant;

said lever being selectively movable along said overrun for engaging said latch bars with said inclined latch blocks and for engaging said raised shoulder with said square-edge boss for preventing an excess movement of said grooves along said embossments.

18. The connection as claimed in claim 17, wherein said engagement of said raised shoulder with said square-edge boss is a abutment engagement, for limiting a relative movement in a forward direction of said accessory relative to said suction disc module.

19. The connection as claimed in claim 18, wherein said engagement of said latch bars on said lever with said inclined latch blocks on said accessory is a latching engagement, for limiting a relative movement of said accessory relative to said suction disc module in a backward direction.

* * * * *